United States Patent [19]

Souji

[11] Patent Number: 4,549,353
[45] Date of Patent: Oct. 29, 1985

[54] DISPLACEMENT MEASURING INSTRUMENT

[75] Inventor: Ichikawa Souji, Kanagawa, Japan

[73] Assignee: Mitutoyo Mfg. Co., Ltd., Tokyo, Japan

[21] Appl. No.: 516,801

[22] Filed: Jul. 25, 1983

[30] Foreign Application Priority Data

Jul. 28, 1982 [JP] Japan ................................ 57-131529
Jul. 28, 1982 [JP] Japan ................................ 57-131530

[51] Int. Cl.⁴ .............................................. G01B 11/04
[52] U.S. Cl. .................................. 33/125 R; 33/125 C
[58] Field of Search ............. 33/125 R, 125 A, 125 C, 33/125 M; 308/6 R; 356/395, 374; 250/237 G

[56] References Cited

U.S. PATENT DOCUMENTS 4,149,319 4/1979 Nelle ................................ 33/125 C
4,250,381 2/1981 Yoshiike et al. ............. 33/125 C X Primary Examiner—Harry N. Haroian
Attorney, Agent, or Firm—Koda and Androlia

[57] ABSTRACT

In a displacement measuring instrument comprising a main scale secured to a first member, and an index scale secured to a second member and reciprocatingly movable together with this second member along the main scale whereby a relative movement between the first and the second members is measured from a relative movement between the main and the index scales, there are provided a highly rigid member rotatably engaged at one end thereof with the second member and at the other end thereof with the index scale whereby the second member and the index scale are connected to each other, and a biasing means loaded between the second member and the highly rigid member for urging the index scale against the main scale.

29 Claims, 21 Drawing Figures

FIG.10
FIG.11
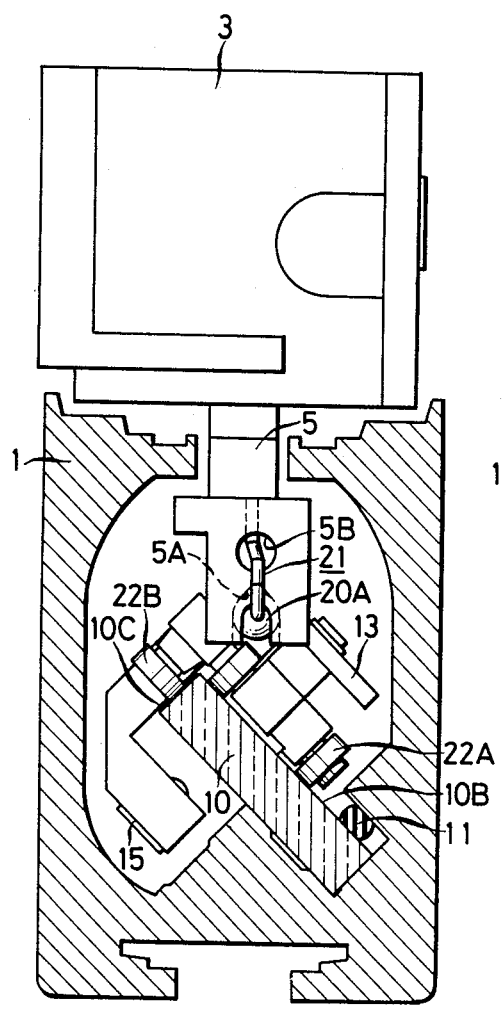
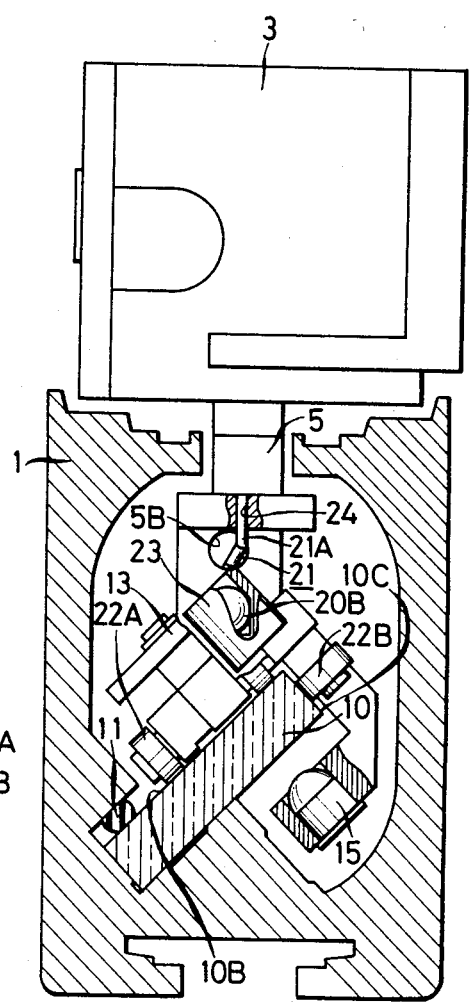

DISPLACEMENT MEASURING INSTRUMENT

BACKGROUND OF THE INVENTION

1. Field of the Invention

This invention relates to displacement measuring instruments, and more particularly to improvements in a displacement measuring instrument wherein a main scale is secured to a first member, a index scale mounted to a second member can be reciprocated together with the second member along the aforesaid first sensor, and a relative displacement between the first and the second members are measured from a relative displacement between the main and index scales.

2. Description of the Prior Art

A length measuring instrument of one type for measuring or adjusting the positional relationship two objects is constructed as shown in FIG. 1 through 3 for example.

In the drawings, an elongate case 1 has a hollow section of substantially square shape, is elongated in a direction perpendicular to the paper surface of FIG. 1, and has an opening 2 along one side surface in the longitudinal direction, over the substantially total length.

A detecting mechanism 3 as being a movable member is brought into abutting contact with the end face of the aforesaid elongate case 1 on the side of the opening 2 through a slidable member 4, and is movable in the longitudinal direction of the elongate case 1.

An arm 5 extending into the elongate case 1 from the opening 2 is integrally formed on the undersurface of this detecting mechanism 3. Furthermore, a pair of magnets 6 are provided at positions close to the opening 2 on the outer side surface of the elongate case 1. A block member 7 formed of a thin iron sheet is attracted by these magnets 6 in a manner to cover the opening 2, whereby dust and the like are precluded from entering the elongate case 1 through the opening 2.

At this time, the block member 7 disposed at a portion, into which the arm 5 of the detecting mechanism 3 is inserted, is extended through a groove 8 having a convex cross section as viewed from sideways, opposite ends of which are opened in the undersurface of the detecting mechanism 3. The arm 5 strided over by this groove 8 is insertable into the elongate case 1.

Inserted into a groove 9 formed in the elongate case 1 in the longitudinal direction thereof is the lower end portion of a main scale 10 made of glass and formed at one side surface 10B (a graduated surface) thereof with a vertical fringe-shaped graduation 10A (Refer to FIG. 2). The main scale 10 is solidly secured by means of a bonding agent 11C and the like.

The arm 5 of the detecting mechanism 3 is extended to a position close to the main scale 10, and a carriage 13 is movably secured to the forward end portion of the arm 5 through a connecting means 12. For example, this connecting means 12 comprises: a linear cantilever spring 12D integrally formed at the distal end thereof with a triangular loop portion 12A and secured at the proximal end thereof to the arm 5 through a washer 12B and a screw 12C; and a truncated cone 12E engageable with the aforesaid loop portion 12A.

The contilever spring 12D is adapted to urge the carriage 13 towards a graduated surface 10B additionally functioning as a first scanning reference surface of the main scale, as well as to urge the carriage 13 towards an end face 10C being a second scanning reference surface perpendicularly intersecting the graduated surface 10B of the main scale 10.

The carriage 13 comprises: a probe mounting member 13A formed into a substantially L shape from a plate; a light element mounting member 13B having a large thickness, being screwed to a bent short side at one end of the probe mounting member 13A and opposed to a surface of the main scale 10, where the graduation 10A is not formed; and a light receiving element mounting member 13C having a large thickness, being screwed (not shown) to a bent long side at the other end of the probe mounting member 13A and opposed to the graduated surface 10B of the main scale 10.

An index scale 14 having a vertical fringe-shaped graduation, not shown, similar to that of the main scale 10 is solidly secured to the surface of the probe mounting member 13A of the carriage 13 in opposed relationship to the graduated surface 10B of the main scale 10. Light emitting elements 15 as being the light source and light receiving elements 16 are arranged such that the index scale 14 and the main scale 10 are interposed therebetween.

In this case, two light emitting elements 15 are solidly secured to the light emitting element mounting member 13B affixed to the L-shaped short side of the probe mounting member 13A, and also two light receiving elements 16 are solidly secured to the light receiving element mounting member 13C affixed to the L-shaped long side of the probe mounting member 13A.

Pluralities of sliders 17 and 18 made of a resin material having a low frictional coefficient such as polyacetal resin are solidly secured to an inner surface of the L shape of the probe mounting member 13A, i.e., the graduated surface 10B as being the first scanning surface of the main scale 10 and a surface opposed to the end face 10C as being the second scanning reference surface perpendicularly intersctıng the graduated surface 10B, respectively. These sliders 17 and 18 are adapted to abut against the graduated surface 10B of the main scale 10 and the end face 10C perpendicularly intersecting the graduated surface 10B through a biasing force of the cantilever spring 12D.

In the above-described arrangement, when one of either the elongate case 1 or the detecting mechanism 3 as being the movable member, e.g., the detecting mechanism 3 is secured to a workpiece to be measured and the other, i.e., the elongate case 1 is solidly secured to mounting surfaces 19A, 19B of a bed of a machine, i.e., a stationary side 19, and, if the workpiece to be measured is moved, then bright and dark fringe patterns are generated between the graduated surface 10A of the main scale 10 and the graduation of the index scale 14. Changes in brightness and darkness of these fringe patterns are read by the light receiving elements 16, whereby a movement value of the workpiece being measured is read, so that measurement can carried out.

In the displacement measuring instrument of the type described, the gap, parallelism and the like between the main scale 10 and the index scale 14 render a very serious influence to the measuring accuracy. For example, in the optical measuring instrument provided with a slit having an interval of the order of 10 $\mu$m, in order to secure a predetermined measuring accuracy, the gap should be kept to be about 20 $\mu$m.

However, opposing surfaces of the main scale 10 and the index scale 14 need not necessarily be planar, but may have undulations or the like. In consequence, it becomes necessary that the main scale 10 and the index scale 14 have a very small sliding resistance to each other and one follows the outer in holding the gap to a certain value.

As the means for this purpose, in the displacement measuring instrument as shown in FIG. 1 thrugh 3, a loop portion 12A at the forward end of the contilever spring 12D is loosely coupled onto a circular truncated cone 12E provided on the index scale 14.

As another specific form for this purpose, as shown in FIG. 5, the forward end portion of the cantilever spring 12D is formed into a sphere 12F, which is received by a V-groove 12G formed on the index scale 14.

The above-described linear cantilever spring causes the main scale and the index scale to be urged against each other, and, when these scales are moved relative to each other in the longitudinal direction, the cantilever spring can hold the index scale in position with respect to one of objects to be measured against the sliding resistance.

To be ideally, the aforesaid cantilever spring 12D is previously formed in accordance with a deflection curve as shown in FIG. 4, and, when installed, becomes parallel to the moving direction of the main scale 10 as shown in FIG. 5, whereby, even when the carriage 13 and the index scale 14 integrally formed therewith are caused to slide in the lateral direction, only a tensile or compressive load is applied to the cantilever 12D, so that the reciprocating motion of the carriage 13 can avoid being affected in its measuring accuracy.

However, in reality, it becomes difficult to install the cantilever spring with respect to the moving direction of the main scale as shown in FIG. 6 (A) and 6 (B) for example, due to a variability in elastic modulus of a spring material forming the cantilever 12D, an error against the ideal deflection curve of the spring form, variabilities in dimensions of the parts other than the cantilever spring 12D, such as the elongate case 1, the main scale 10, the detecting mechanism 3 and the like, further, a variability in parallelism between a machine tool mounted surface and a measuring instrument mounted surface when the measuring instrument is installed on a machine tool or the like.

When the carriage 13 is caused to slide in the lateral direction, the cantilever spring 12D installed in the above-described condition is subjected to a bending moment in addition to the tensile and compressive loads and a deflection is caused to the cantilever spring in the sliding direction, therby presenting a problem of causing an adverse effect to the measuring accuracy.

A deflection λ of the cantilever spring 12D in its oscillating direction will hereunder be extracted.

Firstly, assumption may be made that the cantilever spring 12D in the actually installed state as shown in FIG. 6 is a curved beam having a curvature R as shown in FIG. 7. Forces $F_1$ and $F_2$ and applied to the forward end of the cantilever spring as shown in FIG. 8, when the carriage 13 moves relative to the main scale 10 in a direction indicated by an arrow A in FIG. 7, on condition that an urging force of the carriage 13 applied through the forward end of the cantilever 12D to the main scale 10 is N = 240 g, a coefficient of friction $\mu = 0.3$, a distance from the proximal end to the distal end of the cantilever spring is L (mm), the material quality of wire forming the cantilever spring is SWP-A and the diameter thereof is $\phi$ (mm).

Firstly, the following equations will be obtained from FIG. 7

$$F_1 = 2N \quad (1)$$

$$F_2 = 2/\mu N \quad (2)$$

The following equation will be obtained from the equations (1) and (2).

$$F_2 = \mu F_1 \quad (3)$$

A bending moment M by a desirable cross-section mn at a position a distance S apart from the fixed end of the cantilever spring 12D will be obtained by the following equation.

$$M = F_2 R (\cos\phi - \cos\theta) \quad (4)$$

where $\phi$ indicates a central angle from fixed end to the cross-section mn, and $\theta$ a central angle from the fixed end to the free end.

A deformation-energy $U_s$ stored in this section will be obtained by the following equation.

$$U_s = \frac{1}{2EI_z} \int_o^S M^2 ds = \frac{1}{2EI_z} \int_o^\phi M^2 R d\phi \quad (5)$$

where S indicates a distance from the fixed end to the cross-section mn, F a longitudinal modulus and $I_z$ a geometrical moment of inertia.

The following equation will be obtained by the substitution of the equation (4) into the equation (5).

$$U_s = \frac{1}{2EI_z} \int_o^\phi F_z^2 R^2 (\cos\phi - \cos\theta)^2 \cdot R d\phi \quad (6)$$

$$= \frac{F_2^z \cdot R^3}{2EI_z} \int_o^\phi (\cos\phi - \cos\theta)^2 d\phi$$

A displacement (λs) in a direction of the load (direction of sliding) in this section will be obtained according to the theorem of Castigliano as follows:

$$\lambda s = \frac{\alpha U_2}{\alpha F_2} = \frac{F_2 R^3}{FI_z} \int_o^\phi (\cos\phi - \cos\theta)^2 d\phi \quad (7)$$

In consequence, a displacement (λ) in the direction of the load (direction of sliding) in the whole section (L) will be obtained, with the consideration being paid to the scope of $$\lambda = \frac{F_2 R^3}{EI_z} \int_o^\phi (\cos\phi - \cos\theta)^2 d\phi \quad (8)$$

$$= \frac{F_2 R^3}{EI_z} \left( \frac{\theta}{z} + \theta \cos^2\theta - \frac{3}{2} \sin\theta \cos\theta \right)$$

In addition, the total displacement in the direction of the load (direction of sliding) is 2 λ, with the consideration is paid to a displacement ia a direction opposite to the direction indicated by the arrow A in FIG. 7.

When the detecting mechanism 3 is installed on a machine tool or the like, even if the detecting mechanism 3 is tri-dimentionally fluctuated to a certain degree, the carriage 13 must be accurately urged against the surface of the scale due to the installing accuracy, the straightness of the machine tool itself in the sliding direction and the like. Hence, it is necessary that the wire diameter of the cantilever spring can allow the carriage 13 to form a certain degree of freedom with respect to the detecting mechanism 3.

If consideration is given to such a condition that, even when the machine tool itself is vibrated, the carriage 13 should not float up from the scale surface, and further, to the size of the measuring instrument, then the cantilever 12D must have the wire diameter $\phi = 0.8-1.0$ mm and the length L=30-50 mm. Here, there was adopted the cantilever spring considered to be suitable in its contour and having the wire diameter $\phi = 0.8$ mm and the length L=34.9 mm. Additionally, the longitudinal modulus of the material SWP-A of the cantilever spring is $$E = 2.1 \times 10^4 \text{ Kg/mm}^2.$$

Assumption is made that there is no looseness between the sphere at the forward end of the cantilever spring 12D and the ball bearing.

The results will be shown in Table 1 and errors to a considerable extent are caused to the measuring accuracy. It has been confirmed that these are coincided with the experimental results very well.

TABLE 1

| L = 34.9 mm | | DISPLACEMENT IN $F_1$ DIRECTION | TOTAL DISPLACEMENT 2 $\lambda$mm IN |
|---|---|---|---|
| Rmm | $\theta°$ | $\delta$mm | LOAD DIRECTION |
| 1000 | 2 | 0.61 | 2.4 × 10$^{-3}$ |
| 500 | 4 | 1.22 | 9.4 × 10$^{-3}$ |
| 250 | 8 | 2.43 | 37.6 × 10$^{-3}$ |

In order to obviate the above-described disadvantages, the rigidity of the cantilever spring may be increased. However, in this case, to increase the rigidity, if the wire diameter is increased with the length L of the cantilever spring being not changed, then the degree of freedom of carriage 13 with respect to the detecting mechanism 3 may be decreased, and further, the urging force of the carriage against the main scale may be increased, thus presenting new disadvantages that controllability is lowered due to the increase in sliding resistance of the carriage, increase in wear of the slider 18 as shown in FIG. 7 due to an excessive contacting force, or the like.

In contrast thereto, for example, such a displacement measuring instrument may be thought of that the carriage is supported in a manner to be pulled toward the proximal end of the cantilever spring by the wire spring, to thereby control occurrence of an error in the movement caused by the deflection of the cantilever spring due to the force in the moving direction of the carriage.

However, in this displacement measuring instrument, a biasing means for urging the carriage against the main scale must be provided separately, the measuring instrument is increased in its dimensions to prevent the measuring instrument from being rendered compact in size, and, in order to allow the carriage to follow the surface of the main scale and move, such an arrangement should be adopted that the wire spring is allowed to be deflected in such a manner that the carriage can be displaced within the range of undulations on the surface of the main scale, thus leaving the disadvantage that the error in the measurement caused by the deflection of the wire spring due to the force of the carriage in the moving direction cannot be satisfactorily reduced.

SUMMARY OF THE INVENTION

The present invention has been developed to obviate the above-described disadvantages of the prior art and has as its object the provision of a displacement measuring instrument wherein the sliding resistance due to the reciprocating motion of a scale does not affect a slider support member, so that the measuring accuracy can be improved.

Another object of the present invention is to provide a displacement measuring instrument, dimensions of which are small, so that the instrument can be rendered compact in size.

A further object of the present imvention is to provide a displacement measuring instrument wherein a support member for supporting a carriage and a biasing means for urging the carriage against a main scale can be easily installed.

To the above end, the present invention contemplates that, in a displacement measuring instrument comprising a main scale secured to a first member, and an index scale secured to a second member and reciprocatingly movable together with this second member along the main scale whereby a relative movement between the first and the second members is measured from a relative movement between the main and the index scales, there are provided a highly rigid member rotatably engaged at one end thereof with the second member and at the other end thereof with the index scale whereby the second member and the index scale are connected to each other, and a biasing means loaded between the second member and the highly rigid member for urging the second sensor against the main scale.

Further, to the above end, the present invention contemplates that, in the aforesaid displacement measuring instrument, at least one of the opposite ends of the highly rigid member, which are engaged with the second member and the index scale, is formed into a spherical shape, and a receiving seat complementary in shape to the spherical end and capable of coupling thereto is provided on at least one of the second member and the index scale.

Further, to the above end, the present invention contemplates that, in the aforesaid displacement measuring instrument, the aforesaid receiving seat is open in a direction substantially perpendicular to the reciprocating direction of the index scale and in a direction of approaching the main scale when in the second member, and also open in a direction substantially perpendicular to the reciprocating direction of the index scale and in a direction of receding from the main scale when in the index scale.

Further, to the above end, the present invention contemplates that, in the aforesaid displacement measuring instrument, an end of the highly rigid member on the side of the second member is rotatably supported through a pin shaft to the second member.

Further, to the above end, the present invention contemplates that, in the aforesaid displacement measuring instrument, the biasing means is formed into springs racked across the second member and the highly rigid member for engaging one end of the highly rigid member with the second member and the other end of the highly rigid member with the index scale, whereby the index scale is urged against the main scale through the highly rigid member.

Further, to the above end, the present invention contemplates that, in the aforesaid displacement measuring instrument, the biasing means is formed into a wire spring secured at one end thereof to the second member and secured at the other end thereof to an end of the highly rigid member on the side of the second member from the outer end thereof.

Further, to the above end, the present invention contemplates that, in the aforesaid displacement measuring instrument, the wire spring is circumferentially rotatably secured to an end of the second member.

Further, to the above end, the present invention contemplates that, in a displacement measuring instrument comprising a main scale secured to a first member, and an index scale secured to a second member and reciprocatingly movable together with this second member along the main scale, whereby a relative movement between the first and the second members is measured from a relative movement between the main and the index scales, there are provided a highly rigid member rotatably engaged at one end thereof with the second member and at the other end thereof with the index scale, whereby the second member and the index scale are connected to each other, and a wire spring secured at one end thereof to the second member and at the other end thereof to an end of the highly rigid member on the side of the second member from the outer end thereof, and at least one of said one and the other ends is made movable in a direction parallel to the reciprocating direction of the index scale with respect to the second member and the highly rigid member.

Further, to the above end, the present invention contemplates that, in the aforesaid displacement measuring instrument, the wire spring is formed into a hair pin shape, the second member is formed with a guide portion being in sliding contact with one end of the wire spring to thereby allow the wire spring to move in the reciprocating direction of the index scale, and the other end of the wire spring is solidly secured to the highly rigid member.

Further, to the above end, the present invention contemplates that, in the aforesaid displacement measuring instrument, the wire spring is formed into a hair pin shape, one end thereof is solidly secured to the second member and the other end thereof is coaxially, axially slidably and loosely coupled to the outer end of the highly rigid member.

Further, to the above end, the present invention contemplates that, in the aforesaid displacement measuring instrument, the hair pin-shaped wire spring is of such an arrangement that two rectilinear portions thereof extending to both one end and the other end from a bending protion are in non-parallel to each other in a free condition, and the pasitional relationship between a position, where the wire spring is supported on the second member, and the main scale is determined such that, in a set condition, the both rectlinear portions of he wire spring are in parallel to each other and the index scale is urged against the main scale through the highly rigid member.

Further, to the above end, the present invention contemplates that, in the aforesaid displacement measuring instrument, the wire spring can be displaced by the end of the highly rigid member in the reciprocating direction of the index scale.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein:

FIG. 10 is a sectional view taken along the line X—X in FIG. 9;

FIG. 11 is a sectional view taken along the line XI—XI in FIG. 9;

DETAILED DESCRIPTION OF THE INVENTION

Figure 1:
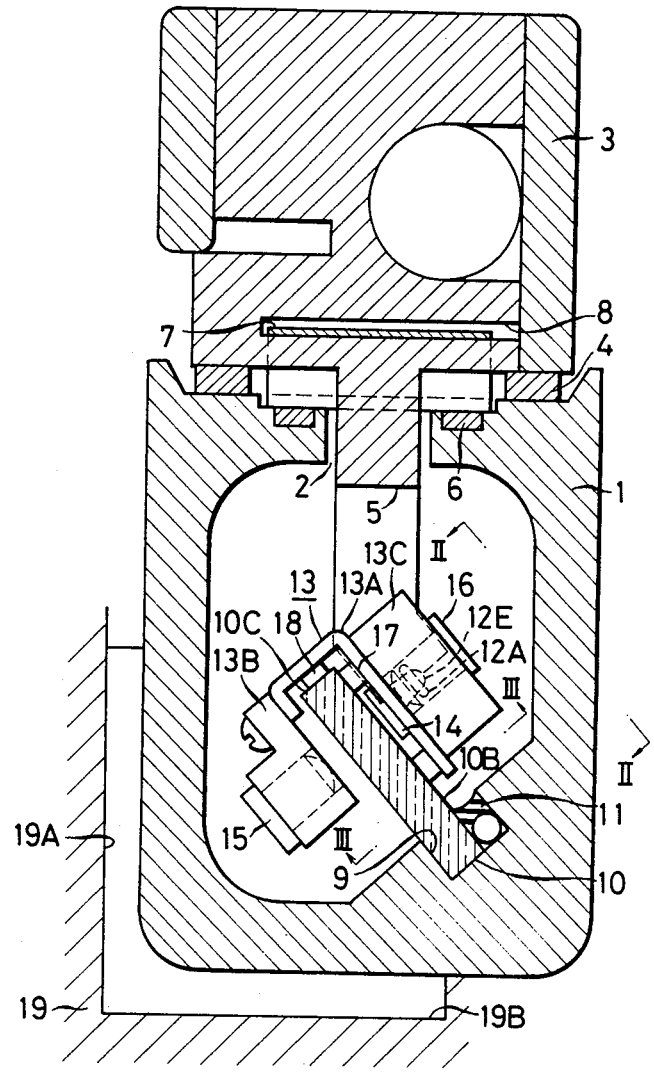
FIG. 1 is a cross-sectinal view showing one example of the arrangement of the displacement measuring instrument of the prior art.
Figure 2:
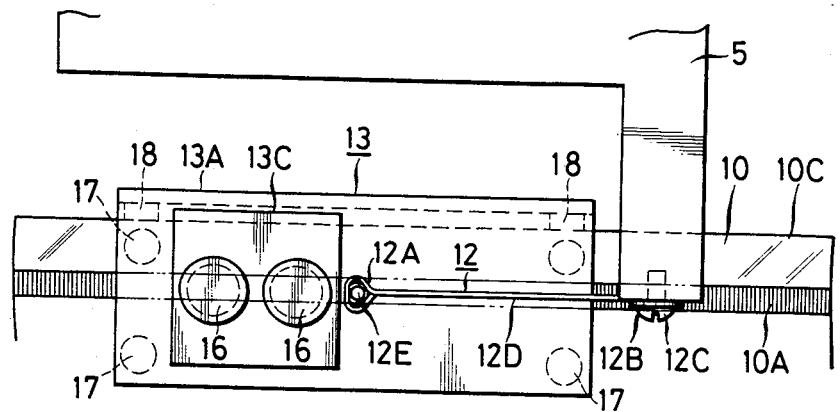
FIG. 2 is a longitudinal sectional view taken along the line II—II in FIG. 1.
Figure 3:
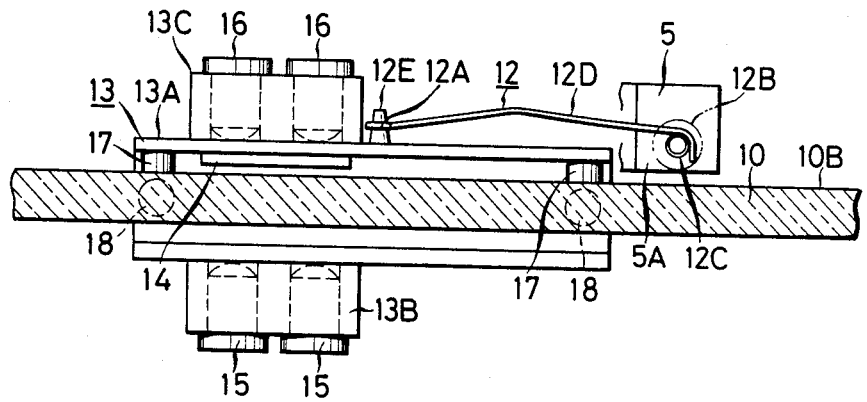
FIG. 3 is a longitudinal sectional view taken along the line III—III in FIG. 1.
Figure 4:
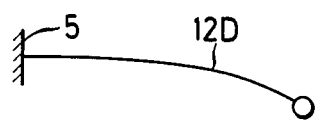
FIG. 4 is a schematic front view showing the from of the cantilever spring in the conventional displacement measuring instrument.
Figure 5:
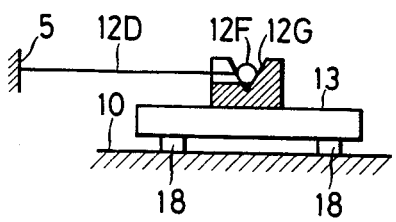
FIG. 5 is a schematic front view showing the ideal use condition of the cantilever spring.
Figure 6:
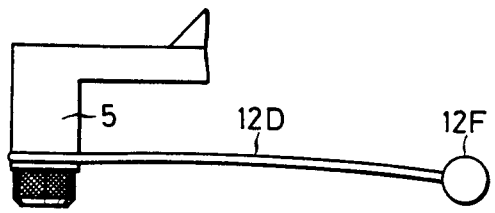
FIG. 6(A) and 6(B) is a schematic front view showing the form of the cantilever spring in the actual use condition.
Figure 6:
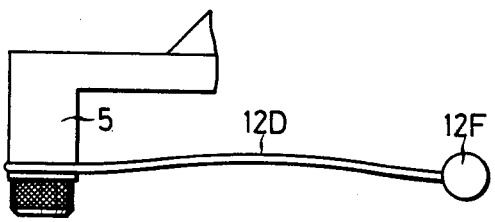
Figure 7:
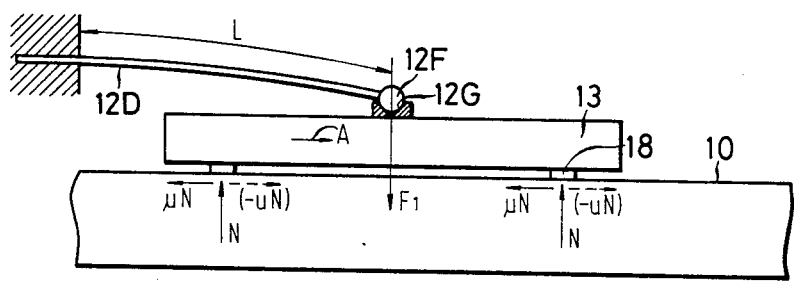
FIG. 7 is a schematic front view showing the analysis model of the cantilever spring in the actual use condition.
Figure 8:
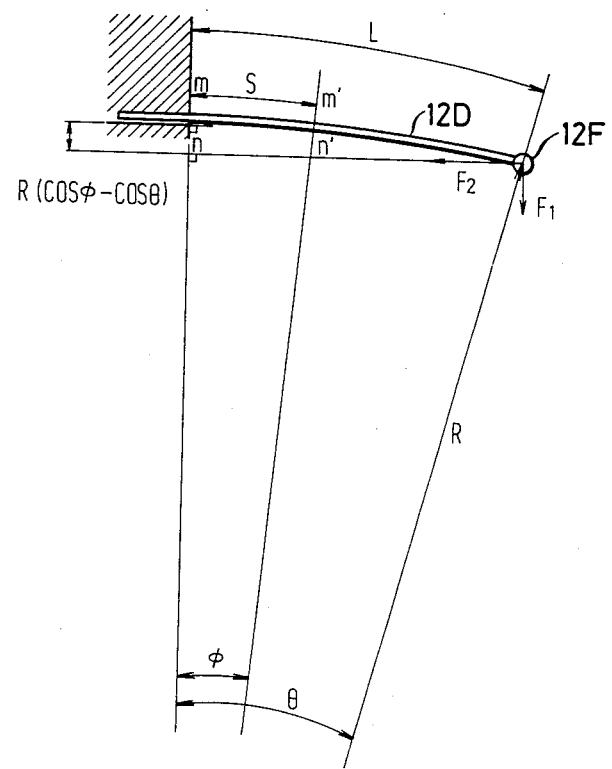
FIG. 8 is a schematic front view showing the deformed condition of the cantilever spring shown in FIG. 7.

Description will hereunder be given of one embodiment in which the present invention is applied to the displacement measuring instrument similar to the conventional one as shown in FIGS. 1 through 3. In this embodiment, same reference numerals are used to designate parts same or similar to those as shown in FIGS. 1 through 8, so that description thereof will be omitted.

Figure 9:
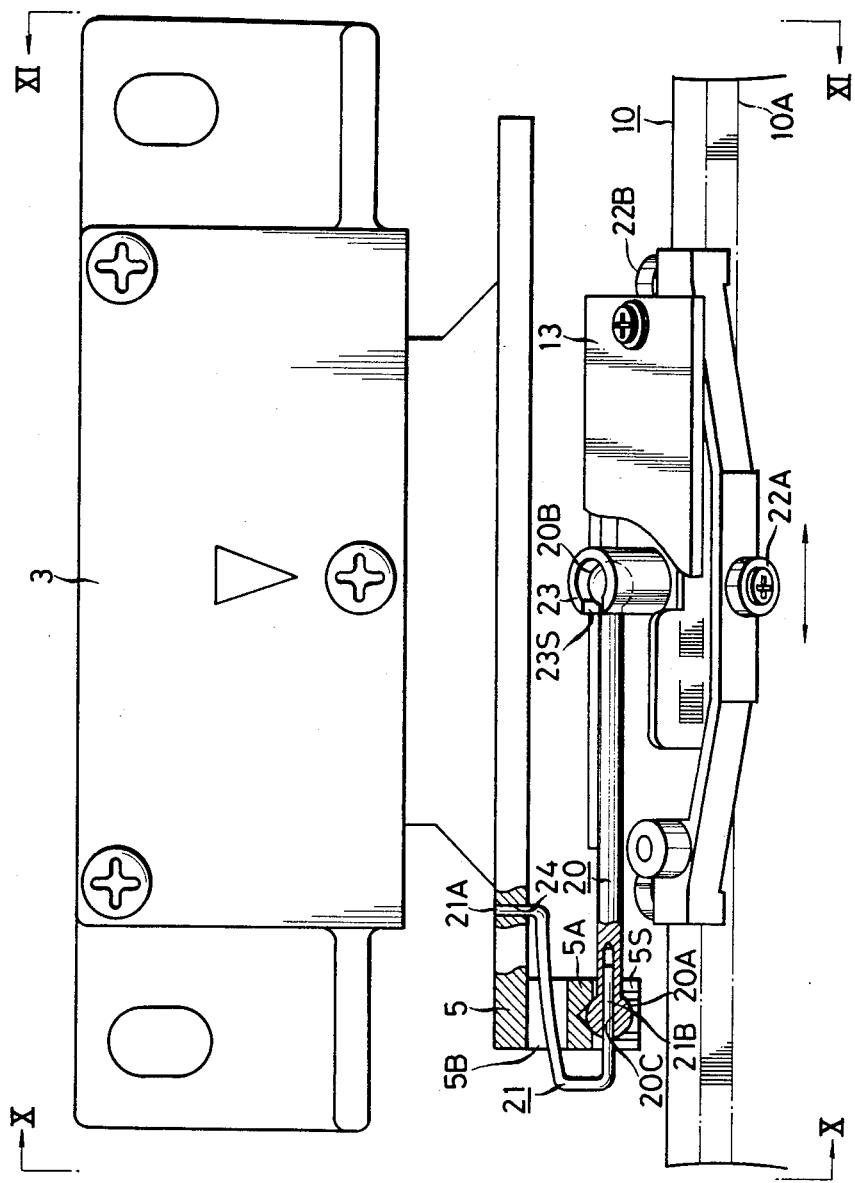
FIG. 9 is a front view, partially sectional, showing the case where the present invention is applied to the displacement measuring instrument similar to the one shown in FIG. 1.

As shown in FIGS. 9 through 11, according to this embodiment, in the displacement measuring instrument similar to the conventional one, there are provided: a rod-like highly rigid member rotatably engaged at one end thereof with the forward end of an arm 5 extending close to a main scale 10 in the detecting mechanism 3 and at the other end thereof to a carriage 13, whereby the arm 5 and the carriage 13 are connected to each other; and a wire spring 21 as being a biasing means racked across the arm 5 and the outer end of the highly rigid member 20 on the side of the arm 5, for biasing the highly rigid member 20 so that the forward end of the highly rigid member 20 can unge the carriage 13 against a graduated surface 10A additionally serving as a first scanning reference surface of the main scale 10 and an end face 10C as being a second scanning surface perpendicularly intersecting a graduated surface 10B of the main scale 10, respectively.

Instead of the sliders of the prior art, rollers 22A and 22B being in rolling contact with the graduated surface 10B and the end face 10C of the main scale 10, respectively, are secured to the carriage 13. The rollers 22A of the carriage 13 being in rolling contact with the graduated surface 10A of the main scale 10 consist of three rollers including a pair of rollers disposed at the forward and rearward end portions and close to the end face 10C in the moving direction of the carriage 13, and one disposed opposite to the pair of rollers and at the center in the moving direction of the carriage 13. The rollers 22B being in rolling contact with the end face 10C consist of a pair of rollers disposed at the forward and rearward portions in the reciprocating direction of the carriage 13.

Spherical ends 20A and 20B are formed at opposite ends of the highly rigid member. These spherical ends 20A and 20B are coupled into a tubular reciving seat 5A formed at the forward end of the arm 5 and a tubular receiving seat 23 secured to the central portion of the carriage 13, respectively, so that the carriage 13 can be reciprocated in association with the arm 5 through the highly rigid member 20.

The receiving seat 5A of the arm 5 is of a tubular shape being open in a direction substantially perpendicular to the reciprocating direction of the carriage 13 and in a direction of approaching the main scale 10, with the bottom face thereof being substantially a V-groove shape in cross section. The receiving seat 23 is of a tubular shape being open in a direction substantially perpendicular to the reciprocating direction of the carriage 13 and in a direction of receding from the main scale 10, with the bottom face thereof being substantially a V-groove shape in cross section. The both receiving seats 5A and 23 are formed at opposing positions in the tubular walls thereof with slits 5S and 23S, which are disposed in the axial directions thereof, in order to allow a rod-like portion of the highly rigid member 20 to pass therethrough.

The wire spring 21 is of substantially a hair pin shape, with a bending portion 21A at one end thereof being coupled into a hole 24 of the arm 5. The wire spring 21 passes through a through-hole 5B formed in the arm 5 and projects in a direction of receding from the carriage 13. The other end of the wire spring 21 is couplingly inserted from the outer end of the spherical end 20A into a coupling hole 20C formed in the spherical end 20A engaged with the receiving seat 5A in a manner to be coaxial with the rod-like portion of the highly rigid member 20.

Figure 12:
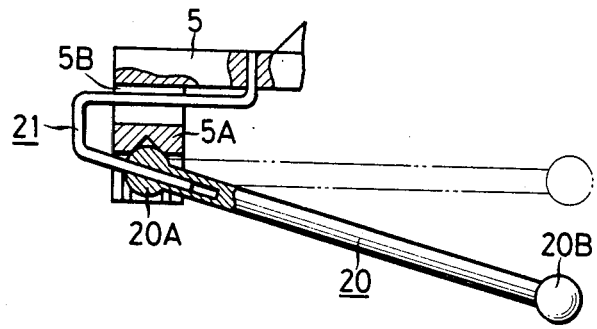
FIG. 12 is a front view showing the free condition of the cantilever spring in the above embodiment.

As shown in FIG. 12, this wire spring 21, in its free condition, has the end 21B as being the free end is in the direction of the angle of the hair pin being open. As shown in FIG. 9, the wire spring 21, in its installed condition, is substantially in parallel to the main scale 10. As this time, the wire spring 21 can urge the carriage 13 toward the main scale 10 through the highly rigid member 20 be its resiliency of a predetermined value.

The highly rigid member 20 has a flexural rigidity as high as that it can impart the resiliency by the wire spring 21 to the carriage 13 with little deflection being caused thereto.

In this embodiment, the diameter was determined to be 2 mm on the same condition as in the displacement measuring instrument of the prior art shown in FIGS. 1 through 8.

The form of the wire spring 21 is determined such that, through the resiliency of he wire spring 21, the spherical end 20A is urged against the receiving seat 5A or the spherical receiving seat 23 in the state where the bending portion 21A at one end of the wire spring 21 is coupled into the hole 24 and the wire spring 21 is set.

Coupling of the bending portion 21A at one end of the wire spring 21 to the hole 24 and also coupling of the other end 21B of the wire spring 21 to the spherical end 20A are in loose state, reaspectively.

In this embodiment, the arm 5 of the detective mechanism 3 and the carriage 3 are connected to each other through the highly rigid member 20 having little diflection, whereby the highly rigid member 20 may be brought into parallel to the moving direction of the carriage 13 in the set state and little deflection is caused to the highly rigid member 20 due to a force in the moving direction of the carriage 13 when the carriage 13 is reciprocated, so that the measuring accuracy can be reduced to a considerable extent.

As apparent from the aforeasid equation (8), for example, a displacement $\lambda$ in the direction of the load at the spherical end 20B of the highly rigid member 20 is inversely proportional to the geometrical moment of inertia of the highly rigid member 20. Consequently, in comparison between the wire diameter 0.8 mm of the cantilever spring 12B as being the connecting member of the prior art as shown in FIGS. 1 through 8 and the diameter 2 mm of the highly rigid member in this embodiment, the geometrical moment of inertia therebetween becomes about 39 times, so that the error in the reciprocating direction of the carriage 13 in this embodiment is reduced to about 1/39 as compared with the case of the displacement measuring instrument of the prior art, thus enabling to improve the measuring accuracy to a considerable extent.

Furthermore, in general, if rollers 22 are mounted between the carriage 13 and the main scale 10 in place of the sliders as in this embodiment, then the error in the measurement due to the load is reduced because the frictional resistance is decreased to reduce the load in the sliding direction. However, the displacement measuring instrument is subjected to an adverse effect due to an acceleration of the vibrations in a sliding direction a tool machine or the like to which the displacement measuring instrument similar to the one according to the present invention, thus resulting in the error in measurement to a considerable extent. However, in the case of this embodiment, the highly rigid member may be increased in its rigidity to a satisfactory extent, so that the adverse effect given to the carriage 13 from the vibrations of the machine tool or the like can be controlled with little deflection being caused to the highly rigid member 20.

More specifically, heretofore, the degree of freedom of the carriage 13 must have been secured to a value of safety, so that the rigidity of the cantilever spring in the sliding direction cannot be satisfactorily increased. In consequence, when the rollers being low in resistance are mounted in place of the sliders, acceleration of the vibrations in the sliding direction acts on the carriage 13, so that a deflection caused to the cantilever spring cannot be avoided. However, in this embodiment, this deflection can be prevented from occurring by the highly rigid member 20.

Figure 13:
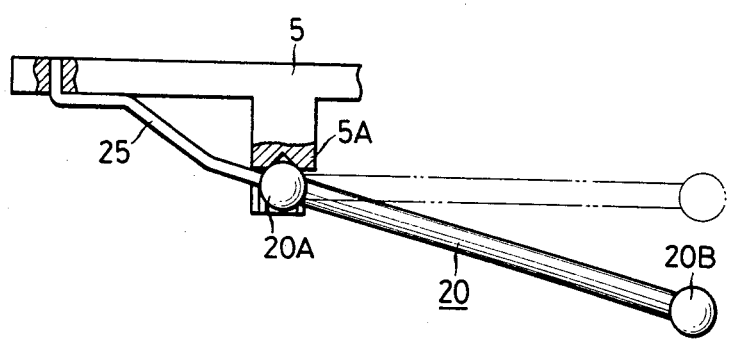
FIGS. 13 through 16 are schematic front views showing a second through a fifth embodiments of the present invention.
Figure 14:
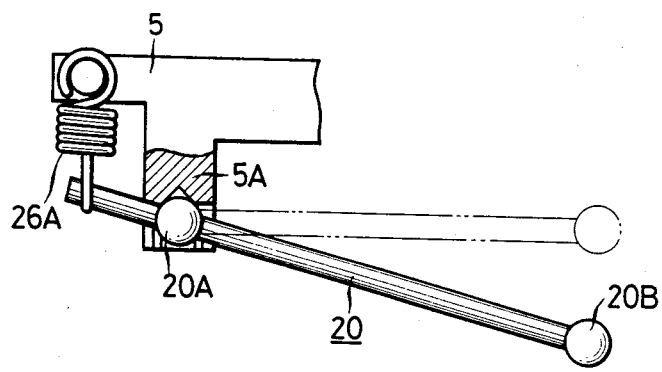
Figure 15:
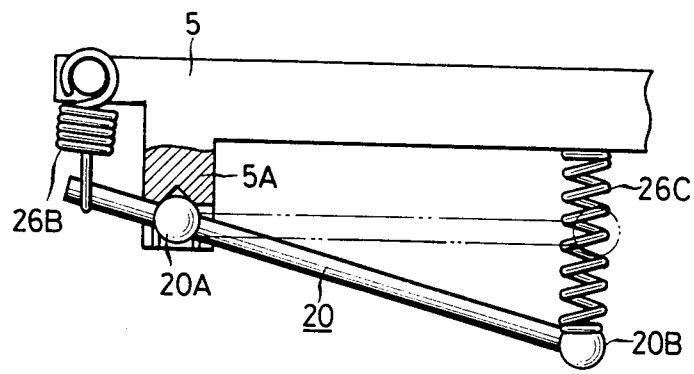

In the above-described embodiment, the substantially hair pin-shaped wire spring urges the carriage 13 against the main scale 10 through the highly rigid member 20, however, the present invention need not necessarily be limited to this embodiment, but, the wire spring may be replaced by anything which can urge the carriage 13 toward the main scale 10. In consequence, a wire spring 25 of any other shape as shown in FIG. 13 may be adopted. Further, as shown in FIG. 14 or 15, a tension coil spring 26A, or a combination of a tension coil spring 26B and a compression coil spring 26C will do.

However, in any one of these cases, when the wire spring or the coil spring is in its set condition, the installed position and the shape thereof must be selected such that the spherical ends 20A and 20B of the highly rigid member 20 are urged against the receiving seats 5A and 23, respectively.

Description will hereunder be given of the fifth embodiment of the present invention as shown in FIGS. 16 through 19.

In this fifth embodiment, one end of the wire spring 27 as being the biasing means for biasing the highly rigid member 20 on the side of the arm 5 is movable in a direction parallel to the reciprocating direction of the carriage 13 with respect to the arm 5.

The wire spring 27 is of substantially a hair pin shape including a pair of rectilinear portions 27A, 27B and a bending portion 27C of substantially a U letter shape connecting the pair of rectilinear portions. One 27A of the rectilinear portions comes into contact with a guide portion 28 of a V letter shape in cross section and provided on the arm 5 so as to be axially movably supported thereon, passes through the through-hole 5B formed in the arm 5 and projects in a direction of receding from the carriage 13. The other 27B of the rectilinear portions is couplingly inserted from the outer end of the spherical end 20A into the coupling hole 20C formed in the spherical end 20A engaged with the receiving seat 5A in a manner to be coaxial with the rod-like portion of the highly rigid member 20.

In the drawings, designated at 27D is a rectangularly bent portion formed at an end of the rectilinear portion 27A. This rectangularly bent portion constitutes a lock against dislodging of the rectilinear portion 27A from the guide portion 28. Further, in the drawings, denoted at 28A is a screw for mounting the guide portion 28 to the arm 5.

Figure 16:
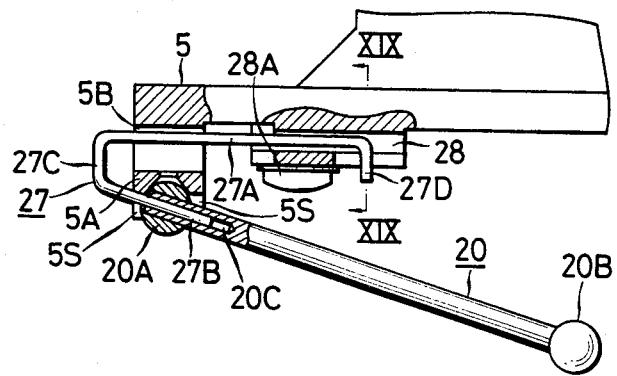
Figure 17:
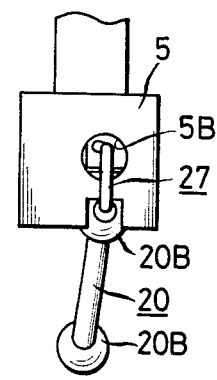
FIG. 17 is a left side view of FIG. 16.
Figure 18:
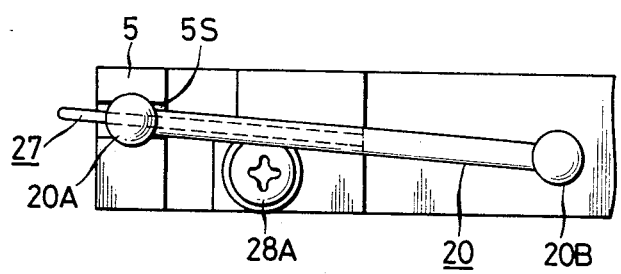
FIG. 18 is a bottom view of FIG. 16.
Figure 19:
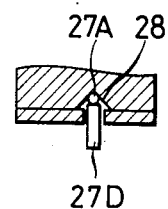
FIG. 19 is a sectional view taken along the line XIX—XIX in FIG. 17.

The wire spring 27, in its free condition, allows the rectilinear portion 27B to open the hain pin angle, whereby the rectilinear portion 27 comes to be in non-parallel to the rectilinear portion 27A as shown in FIG. 16. Whereas, the wire spring 27, in its set condition, allows the rectilinear portion 27B to be substantially in parallel to the main scale 10 and the rectilinear portion 27A, and at this time, the wire spring 27 can urge the carriage 13 toward the main scale 10 through the highly rigid member 20, by its resiliency of a predetermined value.

In this embodiment, since one 27A of the rectilinear portions of the hair pin-shaped wire spring 27 is axiallymovably supported by the guide portion 28 on the arm 5, the carriage 13 is displaced commensurate to the undulations on the surface of the main scale 10, whereby the highly rigid member 20 rocks about the receiving seat 5A, the opening angle of the wire spring 27 is varied during rocking of the highly rigid member 20, and at this time, a force, which tends to cause a relative displacement of the wire spring in the axial drection thereof, occurs between the wire spring 27, the arm 5 and the highly rigid member 20. However, this force is absorbed by the slidable contact between the rectilinear portion 27A of the wire spring 27 and the guide portion 28, so that a force of an exessive value can be prevented from occurring at a contacting portion between the wire spring 27, the arm 5 and the highly rigid member 20.

Figure 20:
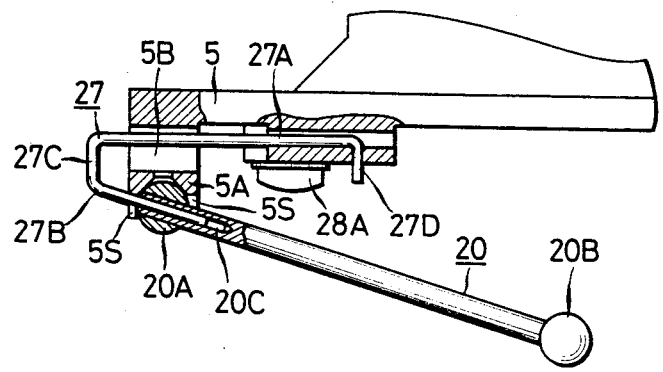
FIG. 20 is a schematic front view showing a sixth embodiment of the present invention.

In this embodiment, one 27A of the rectilinear portions of the hair pin-shaped wire spring 27 is axially displaceably supported on the arm 5 through the guide portion 28, however, the present invention need not be limited to this specific form, but, may be applied to any arrangement in which the wire spring 27 in allowed to be axially displaceable relative to at least one of the arm 5 and the highly rigid member. In consequence, as shown in FIG. 20 for example, the present invention is applicable to an arrangement in which one 27A of the rectilinear portions is affixed to the arm 5 and the other 27B of the rectilinear portions is axially displaceably and loosely coupled into the coupling hole 20C formed at the outer end of the highly rigid member 20.

Furthermore, the hair pin-shaped wire spring 21, only if assured in its locking from dislodging, may be axially displaceably secured to both the arm 5 and the highly rigid member 20.

Additionally, in the above-described embodiment, the substantially hair pin-shaped wire spring urges the carriage 13 toward the main scale 10 through the highly rigid member 20, however, the present invention need not necessarily be limited to this embodiment, but, the wire spring may be a wire spring 25 being of another shape as shown in FIG. 13 for example.

Further, the end of the highly rigid member 20 on the side of the arm 5 is formed into the spherical end 20A, which is urged by the V-groove shaped receiving seat 5A, so that the highly rigid member 20 can rock about the receiving seat 5A, however, the arrangement need not necessarily be limited to this embodiment, but may be one in which the end of the highly rigid member 20 is rotatably supported by a pin shaft.

However, when the end of the highly rigid member 20 is rotatably supported by the pin shaft, the mounting work is troublesome as compared with the case of engaging the spherical end 20A with the receiving seat 5A, and the construction becomes complicated as well.

When the wire spring 21, 25 or 27 is utilized as the biasing means, it becomes advantageous that setting can be easily made.

Furthermore, in the above-described embodiment, the highly rigid member is formed into the rod-like shape, however, the present invention need not be limited to this specific form, but, the highly rigid member 20 may be an elongate member, such for example as a hollow tubular shape.

When this tubular shape is adopted, a large geometrical moment of inertia is obtainable for its weight, and hence, it is advantageous that the adoption of this tubular shape is more preferable than in the above-described embodiment.

In the above-described embodiment, there is adopted a so-called two surface guiding type, in which the carriage 13 is guided by two reference surfaces of the main scale 10, however, the present invention need not necessarily be limited to this specific form, but, a surface other than on the main scale, e.g., a guiding surface formed on the elongate case 1 may be utilized as the guide.

In the above-described embodiment, the present invention is applied to the displacement measuring instrument utilizing optical fringes, however, the present invention is generally applicable to a displacement measuring instrument comprising: a first sensor secured to a first member; a second sensor secured to a second member and capable of being reciprocated together with this second member along the first sensor; and a biasing means for unging the second sensor against the first sensor in a direction substantially perpendicular to the reciprocating direction thereof; whereby a relative displacement between the first and the second members is measured from a relative displacement between the first and the second sensors.

In consequence, the present invention is generally applicable to a displacement measuring instrument of a contact point type, electromagnetic type, electrostatic capacity type or the like, in which a relative displacement between two members is measured from a relative displacement between two sensors.

What is claimed is:

1. A displacement measuring instrument comprising a main scale secured to a first member, and an index scale secured to a second member and reciprocatingly movable together with said second member along the main scale whereby a relative movement between the first and the second members is measured from a relative movement between the main scale and the index scale, wherein there are provided a highly rigid member rotatably engaged at one end thereof with the second member and at the other end thereof with the index scale whereby the second member and the index scale are connected to each other, and a biasing means loaded between the second member and the highly rigid member for urging the index scale against the main scale.

2. A displacement measuring instrument as set forth in claim 1, wherein at least one of the opposite ends of the highly rigid member, which are engaged with the index member and the second scale, is formed into a spherical shape, and a receiving seat complementary in shape to the spherical end and capable of coupling thereto is provided on at least one of the second member and the index scale.

3. A displacement measuring instrument as set forth in claim 2, wherein said receiving seat is open in a direction substantially perpendicular to the reciprocating direction of the index scale and in a direction of approaching the main scale when used in the second member, and also open in a direction substantially perpendicular to the reciprocating direction of the index scale and in a direction of receding from the main scale when used in the index scale.

4. A displacement measuring instrument as set forth in claim 1, wherein an end of the highly rigid member on the side of the second member is rotatably supported through a pin shaft on the second member.

5. A displacement measuring instrument as set forth in claim 1, wherein said biasing means is formed into springs loaded between the second member and the highly rigid member for engaging one end of the highly rigid member with the second member and the other end of highly rigid member with the second member, whereby the index scale is urged against the main scale through the highly rigid member.

6. A displacement measuring instrument as set forth in claim 2, wherein said biasing means is formed into springs loaded between the second member and the highly rigid member for engaging one end of the highly rigid member with the second member and the other end of highly rigid member with the second member, whereby the loaded between is urged against the main scale through the highly rigid member.

7. A displacement measuring instrument as set forth in claim 3, wherein said biasing means is formed into springs loaded between the second member and the highly rigid member for engaging one end of the highly rigid member with the second member and the other end of highly rigid member with the second member, whereby the index scale is urged against the main scale through the highly rigid member.

8. A displacement measuring instrument as set forth in claim 1, wherein said biasing means is formed into a wire spring secured at one end thereof to the second member and secured at the other end thereof to an end of the highly rigid member on the side of the second member, from the other end thereof.

9. A displacement measuring instrument as set forth in claim 2, wherein said biasing means is formed into a wire spring secured at one end thereof to the second member and secured at the other end thereof to an end of the highly rigid member on the side of the second member, from the other end thereof.

10. A displacement measuring instrument as set forth in claim 3, wherein said biasing means is formed into a wire spring secured at one end thereof to the second member and secured at the other end thereof to an end of the highly rigid member on the side of the second member, from the other end thereof.

11. A displacement measuring instrument as set forth in claim 5, wherein said biasing means is formed into a wire spring secured at one end thereof to the second member and secured at the other end thereof to an end of the highly rigid member on the side of the second member, from the other end thereof.

12. A displacement measuring instrument as set forth in claim 6, wherein said biasing means is formed into a wire spring secured at one end thereof to the second member and secured at the other end thereof to an end of the highly rigid member on the side of the second member, from the other end thereof.

13. A displacement measuring instrument as set forth in claim 7, wherein said biasing means is formed into a wire spring secured at one end thereof to the second member and secured at the other end thereof to an end of the highly rigid member on the side of the second member, from the other end thereof.

14. A displacement measuring instrument as set forth in claim 8, wherein said wire spring is circumferentially rotatably secured to an end of the second member.

15. A displacement measuring instrument as set forth in claim 9, wherein said wire spring is circumferentially rotatably secured to an end of the second member.

16. A displacement measuring instrument as set forth in claim 10, wherein said wire spring is circumferentially rotatably secured to an end of the second member.

17. A displacement measuring instrument as set forth in claim 11, wherein said wire spring is circumferentially rotatably secured to an end of the second member.

18. A displacement measuring instrument as set forth in claim 12, wherein said wire spring is circumferentially rotatably secured to an end of the second member.

19. A displacement measuring instrument as set forth in claim 13, wherein said wire spring is circumferentially rotatably secured to an end of the second member.

20. A displacement measuring instrument comprising a main scale secured to a first member, and an index scale secured to a second member and reciprocatingly movable together with said second member along the main scale whereby a relative movement between the first and second members is measured from a relative movement between the main scale and the index scale, wherein there are provided a highly rigid member rotably engaged at one end thereof with the second member and at the other end thereof with the index scale whereby the second member and the index scale are connected to each other, and a wire spring secured at one end thereof to the second member and at the other end thereof to an end of the highly rigid member from the outer end thereof, and at least one of said one and the other ends is made movable in a direction parallel to the reciprocating direction of the index scale with respect to the second member and the highly rigid member.

21. A displacement measuring instrument as set forth in claim 20, wherein said wire spring is formed into a hair pin shape, the second member is formed with a guide portion being in sliding contact with one end of the wire spring to thereby allow the wire spring to move in the reciprocating direction of the index scale, and the other end of the wire spring is solidly secured to the highly rigid member.

22. A displacement measuring instrument as set forth in claim 20, wherein said wire spring is formed into a hair pin shape, one end thereof is solidly secured to the second member and the other end thereof is coaxially, axially slidably and loosely coupled to the outer end of the highly rigid member.

23. A displacement measuring instrument as set forth in claim 21, wherein said hair pin-shaped wire spring is of such an arrangement that two rectilinear portions thereof extending to both one end and the other end from a bending portion are in non-parallel to each other in a free condition, and the positional relationship between a position, where said wire spring is supported on the second member, and the main scale is determined such that, in a set condition, the both rectilinear portions of said wire spring are in parallel to each other and the index scale is urged against the main scale through the highly rigid member.

24. A displacement measuring instrument as set forth in claim 22, wherein said hair pin-shaped wire spring is of such an arrangement that two rectilinear portions thereof extending to both one end and the other end from a bending portion are in non-parallel to each other in a free condition, and the positional relationship between a position, where said wire spring is supported on the second member, and the main scale is determined such that, in a set condition, the both rectilinear portions of said wire spring are in parallel to each other and the index scale is urged against the main scale through the highly rigid member.

25. A displacement measuring instrument as set forth in claim 20, wherein said wire spring can be displaced by the end of the highly rigid member in the reciprocating direction of the index scale.

26. A displacement measuring instrument as set forth in claim 21, wherein said wire spring can be displaced by the end of the highly rigid member in the reciprocating direction of the index scale.

27. A displacement measuring instrument as set forth in claim 22, wherein said wire spring can be displaced by the end of the highly rigid member in the reciprocating direction of the index scale.

28. A displacement measuring instrument as set forth in claim 23, wherein said wire spring can be displaced by the end of the highly rigid member in the reciprocating direction of the index scale.

29. A displacement measuring instrument as set forth in claim 24, wherein said wire spring can be displaced by the end of the highly rigid member in the reciprocating direction of the index scale.

* * * * *